United States Patent [19]

Teller

[11] 3,808,774

[45] *May 7, 1974

[54] ABATEMENT OF ACID GAS EMISSIONS

[75] Inventor: Aaron J. Teller, Great Neck, N.Y.

[73] Assignee: Teller Environmental Systems, Inc., Worcester, Mass.

[ * ] Notice: The portion of the term of this patent subsequent to Mar. 30, 1990, has been disclaimed.

[22] Filed: Oct. 18, 1971

[21] Appl. No.: 190,389

Related U.S. Application Data

[63] Continuation-in-part of Ser. No. 102,561, Dec. 29, 1970, Pat. No. 3,721,066.

[52] U.S. Cl.............................. 55/68, 55/73, 55/74
[51] Int. Cl............................................ B01d 53/04
[58] Field of Search............ 55/67, 68, 73, 74, 197, 55/386, 387, 71; 23/25, 88, 153; 252/463

[56] References Cited
UNITED STATES PATENTS

| | | | |
|---|---|---|---|
| 2,686,151 | 8/1954 | Feldbayer, Jr. et al. | 23/153 |
| 3,406,125 | 10/1968 | Allegvini et al. | 252/463 |
| 3,520,830 | 7/1970 | Chapman, Jr. | 252/463 |
| 2,947,383 | 8/1960 | Schytil et al. | 55/73 |
| 3,503,184 | 3/1970 | Knapp et al. | 55/71 |
| 3,505,008 | 4/1970 | Fyevel et al. | 55/73 |
| 3,721,066 | 3/1973 | Teller | 55/71 |

OTHER PUBLICATIONS

Winchell et al., Elements of Optial Mineralogy, Wiley & Sons, Inc., 1951, pp. 254 2nd 255.

Primary Examiner—Charles N. Hart
Attorney, Agent, or Firm—Chittick, Thompson & Pfund

[57] ABSTRACT

The application discloses that a high efficiency of abatement of acid gas emissions in an effluent gas of an industrial or commercial manufacturing or treatment process can be achieved by passing the effluent through a particulate chromatographic mass of nepheline syenite, a naturally occurring ore, on which a certain amount of water is adsorbed. The wetting of, and the consequent adsorption of water by, the ore may be effected by passing a stream of humid air through the mass of particles either prior to or concurrently with the arrival of the acid gas-laden effluent thereat, or alternatively by passing the effluent through a humidifying zone prior to its coming in contact with the ore. An additional advantage found is that particulate emissions, if present, are also abated. In lieu of nepheline syenite, pot line alumina or activated alumina, in either case pretreated with an aqueous solution of sodium hydroxide or sodium carbonate, may be used as the adsorbent medium. This abstract is not to be taken as a complete exposition or as a limitation of the present invention, however, the full nature and extent of the invention being discernible only by reference to and from the entire disclosure.

23 Claims, No Drawings

ABATEMENT OF ACID GAS EMISSIONS

The instant application is a continuation-in-part of my prior copending application Ser. No. 102,561, filed Dec. 29, 1970, now U.S. Pat. No. 3,721,066, issued Mar. 20, 1973 and assigned to the same assignee as the instant application.

This invention relates to the art of abating acid gas emissions from a gaseous stream or atmosphere in which they are contained, and in particular to novel methods of and means for this purpose which are variants of the basic method and means disclosed and claimed in my aforesaid prior application.

Various commercial and industrial production and/or treatment processes are, as is well known, characterized by the generation and liberation of acid gases. Merely by way of example, in glass manufacture such acid gases as hydrogen fluoride, silicon tetrafluoride and sulfur oxides (e.g., sulfur dioxide and sulfur trioxide) are among the byproducts normally encountered, while in secondary aluminum manufacture such acid gases as hydrogen fluoride, hydrogen chloride and chlorine are produced. The removal of these gases per se from the effluent gas and vapor emissions of such processes is highly desirable both from the standpoint of their economic value and usefulness and from the standpoint of avoiding their escape as pollutants into the atmosphere. The use of wet scrubbers to achieve these ends has been proposed and actually put in practice, but has left much to be desired in terms of simplicity, efficiency and cost.

Basically, therefore, the principal objects of the present invention may be stated as being the provision of novel and improved methods and means for removing acid gases from the effluent gas and vapor emissions of commercial and industrial manufacturing and treatment processes, and the provision of such methods and means which are characterized by a greater degree of efficiency and economy in operation than has heretofore been achieved by known recovery systems and processes.

More particularly, the objectives of the present invention are most advantageously attained by the use of nepheline syenite, a naturally occurring ore. The ore, in particulate form and with a certain amount of water adsorbed thereon, is used as a chromatographic layer or bed adapted to be traversed by the acid gas-containing effluent for selective adsorption or absorption of the acid gases therefrom. The term "adsorption" and its noun, verb and adjective variants as herein used are intended also to include within its scope "absorption" and its variants. In the presently contemplated most usual system, the ore is finely ground to a particle size in the range of about 50 mesh (U.S. sieve) to 5 microns, preferably in the range of 5–20 microns, and is introduced into a baghouse in a batch feed at a level of about 0.3-3 lbs. solids per 15 cfm rate of gas flow to be handled. The ore is treated with water or water vapor, either prior to or after being introduced into the baghouse, the wetting treatment being designed to add to the mass of solids about 10–50 lbs. of water per 100 lbs. of ore. In one form of the basic method disclosed in the aforesaid copending application, this is achieved by adding water to the ore in such a fashion that the water is adsorbed by the material with little or no supernatant liquid remaining, and then drying the ore at about 100°-300°F., preferably at about 200°F., to equilibrium, defined as the state in which no change in weight occurs over a period of 1 hour. In the method of the present invention, the wetting is effected by means of a humid atmosphere acting on the mass of particles; thus, for example, the water may be supplied either by passing a stream of humid or moisture-carrying air through the mass of particles prior to or simultaneously with the arrival of the acid gas-laden effluent, or by passing the effluent first through a humidifying zone and then through the ore where the moisture picked up by the gas stream will be adsorbed by the ore.

Alternatively, the acid gas chromatographic action may also be achieved through the use of such materials as pot line alumina and activated alumina. These materials have heretofore not been considered suitable for this purpose. In accordance with the present invention, however, either type of alumina can be appropriately activated, i.e., provided with an acid gas chromatographic coating, by adding for each 100 lbs. of alumina about 8–12 lbs. of sodium hydroxide or sodium carbonate dissolved in about 20–40 lbs. of water and then drying the material to equilibrium.

The present invention is also characterized by yet another advantage. As is well known, the effluent from a secondary aluminum furnace, for example, will normally contain, in addition to acid gas emissions, various types of particulate emissions as well. The latter are found to include carbonaceous particulates, both combustible and non-combustible, oily particulates, and inorganic particulates such as aluminum chloride, magnesium chloride, aluminum oxide, cryolite, sodium chloride and potassium chloride. The compositions and relative proportions of the particulate emissions in any given quantity of effluent tend, of course, to vary significantly as a function of the rate and type of charge to the furnace and the rate and type of demagging operation (removal of magnesium from the melt) performed. Nevertheless, although removal of these particulate emissions has been attempted by means of such diverse types of heretofore available equipment as baghouses, afterburners, venturis, and different forms of wet scrubbers, none of these methods or types of equipment has been able to cope with and solve the total problem of joint removal of acid gas and particulate emissions. In contrast thereto, the use of wetted nepheline syenite or chromatographically coated alumina in the manner hereinbefore described now enables an abatement of particulate emissions, i.e., a reduction thereof to the range of about 0.003–0.015 grains per standard cubic foot of effluent, to be achieved in the same operation and by the same equipment as the abatement of the acid gas emissions.

The following examples will serve further illustrate the present invention.

EXAMPLE I

Nepheline syenite ore has approximately the following composition:
Silica — 58–62%
Alumina — 22–25%
Calcia — 0.6–0.9%
Ferric oxide — <0.1%
Magnesia — <0.2%
Soda — 8.5–12.5%
Potash — 4.0–5.5%
Water — <1%

900 lbs. of nepheline syenite finely ground to a particle size in the range of 5–50 microns were blown untreated into a baghouse having a filter area of 6,000 sq. ft., so as to form a layer having an average thickness of about 0.035 inch. Effluent gas containing both particulate emissions of the types hereinbefore mentioned (generally in the range of about 0.02–0.25 grains/scf) and acid gas emissions (about 50–100 ppm chlorine, 20 ppm hydrogen chloride, 20 ppm hydrogen fluoride) and at temperatures above 300°F. was drawn from a 30-ton secondary aluminum furnace at a rate of 10,000 standard cfm and was subjected to the action of a high pressure water quench (200 psig at the nozzle and flowing at a rate of about 5–20 ft./min.) which was introduced into the gas duct prior to the gas reaching the baghouse and reduced the temperature of the gas to about 170°F. Over a 7-day operation of the furnace, the emissions in the effluent from the baghouse (which functioned normally without burning or becoming plugged, problems that have normally been encountered) were as follows:

| | |
|---|---|
| Particulate | 0.007g/scf (average) |
| | 0.015g/scf (maximum) |
| Chlorine | 3 ppm (average during chlorination demagging) |
| Hydrogen chloride | 0 ppm |
| Hydrogen fluoride | 0 ppm |

EXAMPLE II 1,200 lbs. of alumina finely ground to a particle size in the range of 100–250 mesh and treated with an aqueous solution of sodium carbonate (9 lbs. of sodium carbonate in 40 lbs. of water per 100 lbs. of alumina) were injected into a baghouse having a 6,000 sq. ft. filter area so as to form a layer having an average thickness of about 0.05 inch. Effluent gas was drawn from a 30-ton secondary aluminum furnace at a rate of 10,000 scfm and passed through the baghouse. Over a 5-day operation of the furnace, the emissions in the effluent from the baghouse (which functioned normally for the entire period without plugging or burning) were as follows:

| | |
|---|---|
| Particulate | 0.008g/scf (average) |
| | 0.020g/scf (maximum) |
| Chlorine | 4 ppm (average during chlorination demagging) |
| Hydrogen chloride | 1 ppm (maximum) |
| Hydrogen fluoride | 0 ppm |

It will be understood that the emissions abatement procedures set forth in the foregoing examples are susceptible to implementation in different ways either in part or in whole. Thus, in a glass manufacturing operation, the nepheline syenite or coated alumina according to the present invention can be introduced continuously into the baghouse, e.g., at a rate of about 0.05–2.0 lbs./min. per 1,000 cfm of gas feed rate, there mixed with the starting effluent bearing the emissions to be removed, and continuously extracted from the baghouse along with the adsorbed contaminants. Still other modifications will readily suggest themselves to those skilled in the art, as will ways (not necessary to describe herein) of regenerating the adsorptive material and recycling and/or disposing of the recovered emissions. The preceding description of the present invention is, therefore, intended for purposes of illustration only, and the invention is not to be deemed as limited except to the extent and as defined in the hereto appended claims.

Having thus described the invention, what is claimed and sought to be protected by Letters Patent is:

1. The method of abating acid gas emissions in an effluent process gas, comprising wetting a particulate mass of nepheline syenite by means of a humid gaseous atmosphere for enabling the nepheline syenite particles to adsorb water and thereby become acid gas chromatographically activated, and passing a stream of said effluent gas into intimate contact with said particulate mass of nepheline syenite, the latter selectively adsorbing said acid gas emissions from said effluent gas.

2. The method of claim 1, wherein said nepheline syenite is finely ground.

3. The method of claim 1, wherein said nepheline syenite is ground to a particle size in the range of 50 mesh (U.S. sieve) to 5 microns.

4. The method of claim 3, wherein the particle size of said nepheline syenite is in the range of about 100–325 mesh.

5. The method of claim 3, wherein the particle size of said nepheline syenite is in the range of about 5–20 microns.

6. The method of claim 1, wherein said nepheline syenite is coarsely ground.

7. The method of claim 1, wherein said nepheline syenite is ground to a particle size in the range of about 8–14 mesh.

8. The method of claim 1, wherein said mass of said nepheline syenite is contained in a baghouse.

9. The method of claim 1, wherein said mass of said nepheline syenite is introduced into said stream of said effluent gas and is then directed therewith into a baghouse, said nepheline syenite with adsorbed acid gas emissions remaining in the baghouse for periodic removal therefrom.

10. The method of claim 1, wherein said mass of said material is in the form of a bed deposited on a screen.

11. The method of claim 1, wherein the wetting of said nepheline syenite is effected by moisture carried by a stream of air passing through said mass of nepheline syenite.

12. The method of claim 11, wherein said stream of air is passed through said mass of nepheline syenite prior to the latter being contacted by said effluent gas.

13. The method of claim 11, wherein said stream of air is passed through said mass of nepheline syenite concurrently with the latter being contacted by said effluent gas.

14. The method of claim 1, wherein the wetting of said nepheline syenite is effected by moisture carried by said stream of effluent gas passing through said mass of nepheline syenite.

15. The method of claim 14, wherein said moisture carried by said stream of effluent gas is imparted thereto by passing the same through a humidifying zone prior to the contact of said effluent gas with said nepheline syenite.

16. The method of claim 15, wherein said stream of effluent gas is subjected in said humidifying zone to a high pressure water quench.

17. The method of abating acid gas emissions in an effluent process gas, comprising preparing a particulate mass of finely ground nepheline syenite, introducing the mass of particles into a baghouse, wetting said mass of particles with water vapor either prior or subsequent to the introduction of said mass of particles into said baghouse, and passing said effluent gas through said baghouse, said nepheline syenite particles selectively adsorbing said acid gas emissions from said effluent gas.

18. The method of claim 17, wherein the extent of wetting of said mass of particles is predetermined to add thereto about 10–50 lbs. of water per 100 lbs. of nepheline syenite.

19. The method of claim 18, wherein said water vapor is added prior to the introduction of said particles into said baghouse.

20. The method of claim 18, wherein said water vapor is added subsequent to the introduction of said particles into said baghouse.

21. The method of claim 18, wherein said water vapor is added by passing a moisture-carrying stream of gas through said mass of particles.

22. The method of claim 21, wherein said gas carrying said water vapor is air.

23. The method of claim 21, wherein said gas carrying said water vapor is said effluent gas.

* * * * *

UNITED STATES PATENT AND TRADEMARK OFFICE
CERTIFICATE OF CORRECTION

PATENT NO. : 3,808,774
DATED : May 7, 1974
INVENTOR(S) : Aaron J. Teller

It is certified that error appears in the above-identified patent and that said Letters Patent are hereby corrected as shown below:

[57] ABSTRACT

Line 5, cancel "mass of"; line 10, cancel "mass of; lines 15-19, cancel "In lieu of nepheline syenite, pot line alumina or activated alumina, in either case pretreated with an aqueous solution of sodium hydroxide or sodium carbonate, may be used as the adsorbent medium."

Column 1, line 62, cancel "mass of solids" and insert therefor -- ore --.

Column 2, line 5, cancel "mass of"; line 7, cancel "mass of"; lines 13-23, cancel "Alternatively, the acid gas chromatographic action may also be achieved through the use of such materials as pot line alumina and activated alumina. These materials have heretofore not been considered suitable for this purpose. In accordance with the present invention, however, either type of alumina can be appropriately activated, i.e., provided with an acid gas chromatographic coating, by adding for each 100 lbs. of alumina about 8-12 lbs. of sodium hydroxide or sodium

UNITED STATES PATENT AND TRADEMARK OFFICE
CERTIFICATE OF CORRECTION

PATENT NO. : 3,808,774                                         Page 2
DATED      : May 7, 1974
INVENTOR(S): Aaron J. Teller It is certified that error appears in the above-identified patent and that said Letters Patent are hereby corrected as shown below:

carbonate dissolved in about 20-40 lbs. of water and then drying the material to equilibrium."; line 48, cancel "or chromatographically coated alumina"; line 54, delete "examples" and insert therefor -- example --; line 54, after "serve" insert -- to --; line 58, cancel "EXAMPLE I".

Column 3, lines 27-48, cancel without prejudice "EXAMPLE II   1,200 lbs. of alumina finely ground to a particle size in the range of 100-250 mesh and treated with an aqueous solution of sodium carbonate (9 lbs. of sodium carbonate in 40 lbs. of water per 100 lbs. of alumina) were injected into a baghouse having a 6,000 sq. ft. filter area so as to form a layer having an average thickness of about 0.05 inch. Effluent gas was drawn from a 30-ton secondary aluminum furnace at a rate of 10,000 scfm and passed through the baghouse. Over a 5-day operation of the furnace, the emissions in the effluent from the baghouse (which functioned normally for the entire period without plugging or burning) were as follows:

UNITED STATES PATENT AND TRADEMARK OFFICE
CERTIFICATE OF CORRECTION

PATENT NO. : 3,808,774  Page 3
DATED : May 7, 1974
INVENTOR(S) : Aaron J. Teller It is certified that error appears in the above-identified patent and that said Letters Patent are hereby corrected as shown below:

| | |
|---|---|
| Particulate | 0.008 g/scf (average) |
| | 0.020 g/scf (maximum) |
| Chlorine | 4 ppm (average during chlorination demagging) |
| Hydrogen chloride | 1 ppm (maximum) |
| Hydrogen fluoride | 0 ppm |

IN THE CLAIMS

Claim 1, col. 4, line 5 - cancel "mass of".
line 10 - cancel "mass of".

Claim 8, col. 4, line 28 - cancel "mass of said".

Claim 9, col. 4, line 30 - cancel "mass of said".

Claim 10, col. 4, line 36 - cancel "mass of said".
col. 4, line 37 - cancel "material and substitute -- nepheline syenite --.

Claim 11, col. 4, line 41 - cancel "mass of".

Claim 12, col. 4, line 44 - cancel "mass of".

Claim 13, col. 4, line 48 - cancel "mass of".

Claim 14, col. 4, lines 53-54 - cancel "mass of".

UNITED STATES PATENT AND TRADEMARK OFFICE
CERTIFICATE OF CORRECTION

PATENT NO. : 3,808,774
DATED : May 7, 1974
INVENTOR(S) : Aaron J. Teller

It is certified that error appears in the above-identified patent and that said Letters Patent are hereby corrected as shown below:

Claim 17, col. 4, lines 65-66 - cancel "a particulate mass of";

Claim 17, col. 4, lines 67-68 - cancel "mass of";
col. 5, line 1 - cancel "mass of".

Claim 18, col. 5, line 7 - cancel "mass of".

Claim 21, col. 6, line 6 - cancel "mass of".

Signed and Sealed this fourteenth Day of October 1975

[SEAL]

Attest:

RUTH C. MASON
*Attesting Officer*

C. MARSHALL DANN
*Commissioner of Patents and Trademarks*